(12) United States Patent
Hashimoto et al.

(10) Patent No.: US 9,200,384 B2
(45) Date of Patent: Dec. 1, 2015

(54) ACRYLIC-FIBER FINISH FOR CARBON-FIBER PRODUCTION, ACRYLIC FIBER FOR CARBON-FIBER PRODUCTION, AND CARBON-FIBER PRODUCTION METHOD

(71) Applicant: MATSUMOTO YUSHI-SEIYAKU CO., LTD., Yao-shi, Osaka (JP)

(72) Inventors: Yoshio Hashimoto, Yao (JP); Takeyoshi Nakayama, Yao (JP); Jun Takaya, Yao (JP); Mikio Nakagawa, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 0 days.

(21) Appl. No.: 14/375,346

(22) PCT Filed: Feb. 14, 2013

(86) PCT No.: PCT/JP2013/053444
§ 371 (c)(1),
(2) Date: Jul. 29, 2014

(87) PCT Pub. No.: WO2013/129115
PCT Pub. Date: Sep. 6, 2013

(65) Prior Publication Data
US 2015/0044125 A1 Feb. 12, 2015

(30) Foreign Application Priority Data
Mar. 2, 2012 (JP) ................. 2012-046549

(51) Int. Cl.
| | | |
|---|---|---|
| D01F 9/24 | (2006.01) | |
| C08K 5/5419 | (2006.01) | |
| C08K 5/521 | (2006.01) | |
| D01F 6/38 | (2006.01) | |
| D06M 13/292 | (2006.01) | |
| D06M 15/643 | (2006.01) | |
| D01F 9/22 | (2006.01) | |

(52) U.S. Cl.
CPC . *D01F 9/24* (2013.01); *C08K 5/521* (2013.01); *C08K 5/5419* (2013.01); *D01F 6/38* (2013.01); *D01F 9/22* (2013.01); *D06M 13/292* (2013.01); *D06M 15/643* (2013.01)

(58) Field of Classification Search
CPC ..... D06M 13/292; D06M 15/643; D01F 9/22; D01F 9/24; D01F 6/38; C08K 5/5419; C08K 5/521
USPC ....................... 423/447.4; 106/481; 526/318.2
See application file for complete search history.

(56) References Cited

U.S. PATENT DOCUMENTS

| | | | |
|---|---|---|---|
| 4,009,248 A | 2/1977 | Kishimoto et al. | |
| 4,938,832 A * | 7/1990 | Schmalz | D06M 13/292 |
| | | | 156/296 |
| 2009/0263576 A1 | 10/2009 | Okabe et al. | |
| 2010/0247911 A1 | 9/2010 | Aso et al. | |

FOREIGN PATENT DOCUMENTS

| | | |
|---|---|---|
| CN | 101326313 A | 12/2008 |
| CN | 101849063 A | 9/2010 |
| CN | 101858037 A | 10/2010 |
| EP | 0100826 A2 | 2/1984 |
| JP | S52-24136 B2 | 6/1977 |
| JP | S60-181322 A | 9/1985 |
| JP | H02-91224 A | 3/1990 |
| JP | H11-012853 A | 1/1999 |
| JP | 2001-172879 A | 6/2001 |
| JP | 2003-201346 A | 7/2003 |
| JP | 2010-174409 A | 8/2010 |
| JP | 2011-184842 A | 9/2011 |

OTHER PUBLICATIONS

Office Action of the corresponding Chinese Patent Application No. 201380012043.5, dated May 15, 2015.
Extended European Search Report of the corresponding European Patent Application No. 13755204.8, dated Sep. 23, 2015.

* cited by examiner

*Primary Examiner* — Daniel C McCracken
(74) *Attorney, Agent, or Firm* — Global IP Counselors, LLP

(57) ABSTRACT

An acrylic-fiber finish for carbon fiber production is prepared into a stable emulsion and applied to a carbon-fiber precursor to prevent gumming up of finish components in precursor production and carbon fiber fusing in baking process. The acrylic-fiber finish is used for carbon-fiber production and includes a modified silicone having a modifying group containing a nitrogen atom and an acidic phosphate ester represented by the following chemical formula (1).

[Chem. 1]

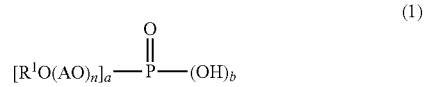

where $R^1$ represents a $C_{6-22}$ alkyl or alkenyl group, A represents a $C_{2-4}$ alkylene group, and AO represents an oxyalkylene group, n represents a mole number of oxyalkylene group and is an integer ranging from 0 to 20, and each of a and b is an integer of 1 or 2 and meets the equation a+b=3.

20 Claims, No Drawings

ACRYLIC-FIBER FINISH FOR CARBON-FIBER PRODUCTION, ACRYLIC FIBER FOR CARBON-FIBER PRODUCTION, AND CARBON-FIBER PRODUCTION METHOD

TECHNICAL FIELD

The present invention relates to an acrylic-fiber finish for carbon-fiber production (hereinafter also referred to as a precursor finish), which is used to produce an acrylic fiber for carbon-fiber production (hereinafter also referred to as precursor), an acrylic fiber for carbon-fiber production applied with the finish, and a carbon-fiber production method which employs the finish.

BACKGROUND ART

Carbon fiber is employed as a fiber for reinforcing a composite material comprising a plastic usually called matrix resin owing to its excellent mechanical property, and is applied widely in various end uses including aerospace industry, sports goods industry, and other general industries.

A common method for manufacturing carbon fiber involves a process of producing precursor (also referred to as fiber production process), a process of converting the precursor into an oxidized fiber in an oxidative atmosphere at 200 to 300 deg.C. (hereinafter also referred to as oxidative stabilization process), and a process of carbonizing the oxidized fiber in an inert atmosphere at 300 to 2,000 deg.C. (hereinafter also referred to as carbonization process). The oxidative stabilization and carbonization processes are hereinafter also collectively referred to as baking process. The process of producing precursor includes a drawing step where acrylic fiber is drawn with a draw ratio higher than that for an ordinary acrylic fiber. At the drawing step, acrylic fiber is apt to adhere to adjacent fiber strands to be drawn unevenly under high draw ratio, and processed into nonuniform precursor. Such nonuniform precursor poses a problem, i.e., insufficient tenacity of resultant carbon fiber produced by baking the precursor. The baking process also poses another problem, i.e., fusing of single precursor fibers being baked, leading to reduced quality and grade of resultant carbon fiber.

For preventing the adhesion of single precursor fiber strands and fusing of carbon fiber, a number of techniques for applying finishes to precursors have been proposed (see Japanese patent documents JP-A-60-181322 and JP-A-2001-172879), and widely used in industries. The techniques employ silicone finishes attaining low fiber-to-fiber wet friction in wet condition or at high temperature and excellent fiber detaching property, especially finishes comprising amino-modified silicones which cross-link on fiber to improve the heat resistance of the finish-applied fiber.

Amino-modified silicone finishes usually employed are aqueous emulsions of amino-modified silicone oils. A surfactant is employed for making an aqueous emulsion of an amino-modified silicone having no self-emulsification property. After applying such aqueous emulsion finish to precursor, the precursor fiber is fed to drying process for removing the water in the aqueous emulsion. Then the precursor is heated and drawn in drawing process to be processed into highly drawn precursor. Amino-modified silicones have excellent thermal cross-linking performance, and their cross-linking behavior is accelerated on heater rollers in drying and drawing processes to increase stain on the rollers (hereinafter also referred to as gumming up). The stain causes precursor breakage or fluffs on precursor, and decreases precursor production efficiency because of the work for cleaning the stain.

For solving such problems, finish formulae containing an antioxidant for inhibiting such gumming up have been proposed as in Japanese patent documents JP-A-2-91224 and JP-A-11-012853.

SUMMARY OF INVENTION

Technical Problem

An antioxidant contained in silicone finishes can inhibit silicone cross-linking in the drying and drawing processes mentioned above. On the other hand, the antioxidant accelerates the decomposition of silicones to deteriorate the heat resistance of silicone finishes. Thus such silicone finishes fail to prevent the fusing of carbon fiber in baking process and the resultant carbon fiber has insufficient tenacity. In addition, silicone finishes containing an antioxidant are made into unstable aqueous finish emulsion which cannot attain uniform finish application to precursor strands constantly over a long time.

Based on such technical background, the present invention aims to provide an acrylic-fiber finish for carbon-fiber production, which is made into stable emulsion used for producing a carbon-fiber precursor and inhibits gumming up in precursor production (fiber production process) and fusing of carbon fiber in baking process; an acrylic fiber for carbon-fiber production applied with the finish; and a carbon-fiber production method which employs the finish.

Technical Solution

The inventors have studied to solve the problems mentioned above, and found that a finish containing a modified silicone having a modifying group containing a nitrogen atom and a specific acidic phosphate ester having an acidic hydroxyl group can solve the problems.

In other words, the acrylic-fiber finish for carbon-fiber production of the present invention comprises essentially a modified silicone having a modifying group containing a nitrogen atom, and an acidic phosphate ester represented by the following chemical formula (1).

[Chem. 1]

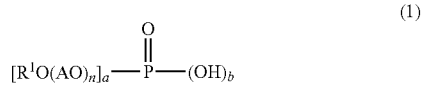

where $R^1$ represents a $C_{6-22}$ alkyl or alkenyl group, A represents a $C_{2-4}$ alkylene group, and AO represents an oxyalkylene group, n represents a mole number of oxyalkylene group and is an integer ranging from 0 to 20, and each of a and b is an integer of 1 or 2 and meets the equation a+b=3.

The weight ratio between the modified silicone and the acidic phosphate ester should preferably range from 99.6:0.4 to 90:10.

The acid value of the acidic phosphate ester should preferably range from 15 to 500 mgKOH/g.

The content of the nitrogen atom should preferably range from 0.35 to 3.2 wt % of the modified silicone, and the modified silicone should preferably be an amino-modified silicone.

The weight ratio of the modified silicone should preferably range from 50 to 95 wt % of the non-volatile components of the finish.

The acrylic-fiber finish of the present invention should preferably further comprises a nonionic surfactant, and the weight ratio of the surfactant should preferably range from 1 to 40 wt % of the non-volatile components of the finish.

The acrylic-fiber finish of the present invention should preferably be dispersed in water to form an emulsion.

The acrylic fiber for carbon-fiber production of the present invention is produced by applying the acrylic-fiber finish to an acrylic fiber that is a basic material of acrylic fiber for carbon-fiber production.

The carbon-fiber production method of the present invention comprises the steps of producing an acrylic fiber for carbon-fiber production by applying an acrylic-fiber finish to an acrylic fiber, the acrylic fiber being a basic material for the acrylic fiber for carbon-fiber production; convering the acrylic fiber, with the acrylic-fiber finish into an oxidized fiber the finish-applied acrylic fiber in an oxidative atmosphere at 200 to 300 deg.C.; and carbonizing the oxidized fiber in an inert atmosphere at 300 to 2,000 deg.C.

Advantageous Effects of Invention

The acrylic-fiber finish for carbon-fiber production of the present invention is made into a stable aqueous emulsion. The finish applied onto acrylic fiber that is the basic material of acrylic fiber for carbon-fiber production does not gum up and achieves high fiber production efficiency. The good heat resistance of the finish inhibits fusing of carbon fiber through oxidative stabilization and carbonization processes to improve the tenacity of resultant carbon fiber. The carbon-fiber production method of the present invention enables the production of high-tenacity carbon fiber owing to the acrylic-fiber finish for carbon-fiber production applied to precursor.

MODE FOR CARRYING OUT THE INVENTION

The primary aim of the acrylic-fiber finish for carbon-fiber production (precursor finish) of the present invention is its application to acrylic fiber that is the basic material of carbon fiber precursor, before the drawing step in the production process of acrylic fiber for carbon-fiber production (precursor). The finish comprises essentially a modified silicone having a modifying group containing the nitrogen atom and a specific acidic phosphate ester. The finish is described below in detail.

[Modified Silicone Having a Nitrogen-Containing Modifying Group]

The precursor finish of the present invention comprises essentially a modified silicone having a modifying group containing the nitrogen atom (hereinafter also referred to as a modified silicone (A)). The functional group in the modified silicone (A) is not specifically restricted, so far as it is a modifying group containing the nitrogen atom. The modifying group containing the nitrogen atom includes a modifying group containing amino bond or imino bond (i.e., amino group) and a modifying group containing amide bond (i.e., amide group), and can contain a plurality of various bonds including amino bond and amide bond. The nitrogen-containing modifying group can be bonded to the side chain of the main chain, i.e., silicone, to the terminal of the main chain, or to the both. The modified silicone can further contain polyoxyalkylene group, such as polyoxyethylene group, polyoxypropylene group and polyoxybutylene group.

A modified silicone having a modifying group containing the nitrogen atom includes, for example, amino-modified silicone, aminopolyether-modified silicone, amide-modified silicone and amidepolyether-modified silicone. One of or a plurality of those silicones can be employed.

The content of a nitrogen atom contained in the modified silicone (A) should preferably range from 0.35 to 3.2 wt %, more preferably from 0.37 to 2.2 wt %, and further more preferably from 0.40 to 1.3 wt %. A content of a nitrogen atom less than 0.35 wt % can deteriorate the stability of an aqueous emulsion of the modified silicone (A). On the other hand, a content of a nitrogen atom more than 3.2 wt % can accelerate the thermal cross-linking of the modified silicone (A) to cause problems including increased stickiness and gumming up of the silicone, which cannot be prevented even by an acidic phosphate ester blended with the silicone.

Of those modified silicones (A), amino-modified silicone is preferable for the stability of its aqueous emulsion and the high effect of the combination of the silicone and an acidic phosphate ester.

[Amino-Modified Silicone]

The structure of an amino-modified silicone included in the modified silicone (A) is not specifically restricted. The amino group, i.e., modifying group, in the amino-modified silicone can be bonded to the side chain of the main chain, i.e., silicone, to the terminal of the main chain, or to both. The amino group can either be a monoamine or polyamine, and both of them can exist in one molecular of the amino-modified silicone.

The amount of amino group ($NH_2$) contained in the amino-modified silicone (hereinafter referred to as amino wt %) should preferably range from 0.4 to 3.7 wt %, more preferably from 0.42 to 2.5 wt %, further more preferably from 0.46 to 1.5 wt %. An amino wt % less than 0.4 wt % can deteriorate the stability of an aqueous emulsion of the amino-modified silicone. On the other hand, an amino wt % more than 3.7 wt % can accelerate the thermal cross-linking of the amino-modified silicone to cause problems including increased stickiness and gumming up of the silicone, which cannot be prevented even by an acidic phosphate ester blended with the silicone.

The viscosity of the amino-modified silicone at 25 deg.C. is not specifically restricted, though excessively low viscosity of the amino-modified silicone can make the resultant finish apt to be dropped off from fiber or deteriorate the stability of the aqueous emulsion of the resultant finish to cause nonuniform finish application on fiber and failure in preventing fiber from fusing. On the other hand, excessively high viscosity of the amino-modified silicone can result in increased stickiness and gumming up of the silicone. For preventing those troubles, the viscosity of the amino-modified silicone at 25 deg.C. should preferably range from 100 to 15,000 $mm^2/s$, more preferably from 500 to 10,000 $mm^2/s$, and further more preferably from 1,000 to 5,000 $mm^2/s$.

The amino-modified silicone is exemplified by the following chemical formula (2).

[Chem. 2]

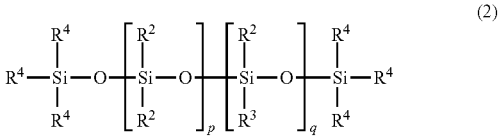

(2)

In Chem. 2, $R^2$ is a $C_1$-$C_{20}$ alkyl or aryl group, preferably a $C_1$-$C_{10}$ alkyl or aryl group, more preferably a $C_1$-$C_5$ alkyl group, and further more preferably a methyl group. The plurality of $R^2$s in Chem. 2 can either be the same or different. $R^3$ is a group represented by the following chemical formula (3). $R^4$ is a group represented by $R^2$, $R^3$ or —$OR^{10}$, and preferably $R^2$. The plurality of $R^4$s in Chem. 2 can either be the same or different. $R^{10}$ is a hydrogen atom or $C_1$-$C_6$ alkyl group, preferably a hydrogen atom or $C_1$-$C_4$ alkyl group, and more preferably a hydrogen atom or methyl group; p is a number ranging from 10 to 10000, preferably from 50 to 5000, and more preferably from 100 to 2000; and q is a number ranging from 0.1 to 1000, preferably from 0.5 to 500, and more preferably from 1 to 100.

[Chem. 3]

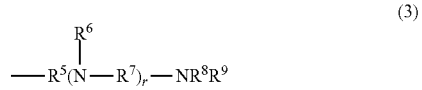

(3)

In Chem. 3, each of $R^5$ and $R^7$ is independently a $C_1$-$C_6$ alkylene group, and preferably a $C_1$-$C_3$ alkylene group. Each of $R^6$, $R^8$ and $R^9$ is independently a hydrogen atom or $C_1$-$C_{10}$ alkyl or aryl group, preferably a hydrogen atom or $C_1$-$C_5$ alkyl group, and more preferably a hydrogen atom; and r is a number ranging from 0 to 6, preferably from 0 to 3, and more preferably from 0 to 1.

[Acidic Phosphate Ester]

The precursor finish of the present invention comprises essentially an acidic phosphate ester (hereinafter also referred to as an acidic phosphate ester (B)) represented by the chemical formula (1) mentioned above. The acidic phosphate ester (B) employed in the present invention is an un-neutralized phosphate ester, without forming a salt, and has an acidic hydroxyl group. A finish containing a specific acidic phosphate ester and modified silicone having a nitrogen-containing modifying group can inhibit gumming up of finish components in fiber production process, and also inhibit fusing of carbon fiber in baking including oxidative stabilization process and carbonization process. In addition, such finish can be prepared into a stable emulsion. One of or a combination of at least two of the acidic phosphate esters (B) can be employed.

In Chem. 1, $R^1$ is a $C_6$-$C_{22}$ alkyl or alkenyl group. $R^1$ of an aromatic hydrocarbon group or $R^1$ having a carbon number more than 22 makes the acidic phosphate ester coke in baking to prevent the conversion of precursor into carbon fiber of graphite structure and cause low tenacity of the resultant carbon fiber. On the other hand, $R^1$ having a carbon number less than 6 results in an aqueous finish emulsion having poor stability. The carbon number of $R^1$ should preferably range from 8 to 20, more preferably from 10 to 18 and further more preferably from 10 to 16. For preventing the acidic phosphate ester from coking, $R^1$ should preferably be an alkyl group. The carbon number of $R^1$ can be distributional and $R^1$ can be linear or branched.

A represents $C_2$-$C_4$ alkylene group, and AO represents an oxyalkylene group, in other words, oxyethylene, oxypropylene or oxybutylene group. For the oxyalkylene group, oxyethylene or oxypropylene group is preferable, and oxyethylene group is more preferable. The number of oxyalkylene repeat unit, n, is an integer ranging from 0 to 20, preferably from 2 to 18, more preferably from 5 to 15, and further more preferably from 8 to 12. The number of the repeat unit more than 20 can result in an aqueous finish emulsion having poor stability. Oxyalkylene groups, AO, constituting a polyoxyalkylene group, (AO)n, can be the same or different. Each of a and b is an integer of 1 or 2, and meets the expression, a+b=3.

The acid value of the acidic phosphate ester (B) should preferably range from 15 to 500 mgKOH/g, more preferably from 20 to 350 mgKOH/g and further more preferably from 50 to 200 mgKOH/g. An acidic phosphate ester (B) having an acid value less than 15 mgKOH/g can fail to prevent gumming up of finish components in fiber production process and fusing of carbon fiber in baking. On the other hand, an acidic phosphate ester (B) having an acid value more than 500 mgKOH/g can result in an aqueous finish emulsion having poor stability. The acid value in the present invention is the number of milligrams of potassium hydroxide required for neutralizing the acidic hydroxyl groups in 1 g of an acidic phosphate ester.

The acidic phosphate ester (B) represented by the chemical formula (1) mentioned above falls into two groups, depending on the combination of a and b in the formula, acidic phosphate monoester (B1) represented by the following chemical formulae (4) and acidic phosphate diester (B2) represented by the following chemical formulae (5).

[Chem. 4]

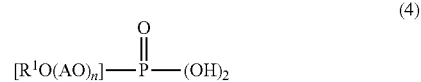

(4)

where $R^1$, A, AO and n are the same as those in the chemical formula (1).

[Chem. 5]

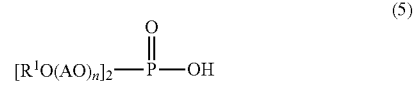

(5)

where $R^1$, A, AO and n are the same as those in the chemical formula (1).

The examples of the acidic phosphate ester (B) include hexylphosphate ester, octylphosphate ester, decylphosphate ester, laurylphosphate ester, tridecylphosphate ester, myristylphosphate ester, cetylphosphate ester, stearylphosphate ester, behenylphosphate ester, oleylphosphate ester, 2-ethylhexylphosphate ester, isoheptylphosphate ester, isooctylphosphate ester, isononylphosphate ester, isodecylphosphate ester, isoundecylphosphate ester, isolaurylphosphate ester, isotridecylphosphate ester, isomyristylphosphate ester, isocetylphosphate ester, isostearylphosphate ester, and their polyoxyethylene, polyoxypropylene or polyoxybutylene adducts.

The acidic phosphate ester (B) can be produced in a known method. For example, an inorganic phosphate such as inorganic phosphate anhydride, $P_2O_5$, can be reacted with a compound having an alcoholic hydroxyl group such as alcohol or polyoxyalkylene alkyl ether (hereinafter also referred to as raw material alcohol) in an optional molar ratio to be made into the acidic phosphate ester (B).

The molar ratio of $P_2O_5$ to 1 mole of a compound such as a raw material alcohol should preferably range from 0.1 to 0.8, more preferably from 0.15 to 0.6, and further more preferably from 0.2 to 0.4. A molar ratio of $P_2O_5$ more than 0.8 can result in an aqueous finish emulsion of poor stability. On the other hand, a molar ratio less than 0.1 can fail to prevent gumming up of finish components in fiber production process or fusing of carbon fiber in baking.

Inorganic phosphate such as $P_2O_5$ is reacted with a raw material alcohol into a mixture of an acidic phosphate monoester (B1) and acidic phosphate diester (B2). The ratio of the acidic phosphate monoester (B1) and acidic phosphate diester (B2) can be controlled by controlling the molar ratio of $P_2O_5$ to 1 mole of the raw material alcohol. The acidic phosphate ester (B) can contain only an acidic phosphate monoester (B1) or acidic phosphate diester (B2), though a mixture of an acidic phosphate monoester (B1) and acidic phosphate diester (B2) is preferable. The molar ratio of an acidic phosphate monoester (B1) and acidic phosphate diester (B2), B1:B2, should preferably range from 5:95 to 80:20, more preferably from 10:90 to 70:30, and further more preferably from 15:85 to 50:50, for improving the stability of resultant aqueous finish emulsion. The molar ratio, B1:B2, of the mixture of an acidic phosphate monoester (B1) and acidic phosphate diester (B2) can be determined by an known method with NMR.

[Precursor Finish]

The precursor finish of the present invention essentially comprises the modified silicone (A) and acidic phosphate ester (B) mentioned above. For better effect of the present invention, the modified silicone (A) and acidic phosphate ester (B) should be blended in a specific ratio, i.e., a small ratio of the acidic phosphate ester (B) and a much more ratio of the modified silicone (A), rather than blending them without controlling their ratios. The weight ratio of the modified silicone (A) and acidic phosphate ester (B) (modified silicone:acidic phosphate ester weight ratio) should preferably range from 99.6:0.4 to 90:10, more preferably from 99.3:0.7 to 92:8, further more preferably from 99:1 to 95:5, and most preferably from 99:1 to 97:3. A weight ratio more than 99.6:0.4 can fail to prevent gumming up of finish components in fiber production and fusing of carbon fiber in baking. On the other hand, a weight ratio less than 90:10 can result in an aqueous finish emulsion of poor stability, and in addition facilitate the decomposition of silicone to reduce the heat resistance of the finish and fail to prevent fusing of carbon fiber in baking.

The weight ratio of the modified silicone (A) in the non-volatile components of a precursor finish should preferably range from 50 to 95 wt %, more preferably from 55 to 90 wt %, further more preferably from 60 to 90 wt % and most preferably from 70 to 90 wt %. A weight ratio less than 50 wt % leads to poor effect for preventing carbon fiber fusing in baking and can fail to produce high-tenacity carbon fiber. On the other hand, a weight ratio more than 95 wt % causes difficulty in making aqueous finish emulsion resulting in poorly stable finish emulsion. The non-volatile components mentioned in the present invention means the complete dry components obtained by heating a finish at 105 deg.C. to remove solvents to a constant weight.

The weight ratio of the acidic phosphate ester (B) in the non-volatile components of the precursor finish should preferably range from 0.3 to 7 wt %, more preferably from 0.4 to 6 wt %, further more preferably from 0.5 to 5 wt % and most preferably from 0.7 to 4 wt %. A weight ratio less than 0.3 wt % can lead to poor effect for preventing gumming up of the finish components in fiber production process and carbon fiber fusing in baking. On the other hand, a weight ratio more than 7 wt % can result in an aqueous finish emulsion of poor stability, and accelerate the decomposition of silicone in the finish leading to poor heat resistance of the finish.

The precursor finish of the present invention should preferably contain a surfactant other than the acidic phosphate ester (B). The surfactant is used as an emulsifier to emulsify or disperse the modified silicone mentioned above in water. The surfactant is not specifically restricted, and can be selected from nonionic, anionic, cationic and amphoteric surfactants known to those skilled in the art. One of or a combination of at least two of such surfactants can be used.

The nonionic surfactants include, for example, linear polyoxyalkylene alkylethers, such as polyoxyethylene hexyl ether, polyoxyethylene octyl ether, polyoxyethylene decyl ether, polyoxyethylene lauryl ether and polyoxyethylene cetyl ether; branched polyoxyalkylene primary alkyl ethers, such as polyoxyethylene 2-ethylhexyl ether, polyoxyethylene isocetyl ether and polyoxyethylene isostearyl ether; branched polyoxyalkylene secondary alkyl ethers, such as polyoxyethylene 1-hexylhexyl ether, polyoxyethylene 1-octylhexyl ether, polyoxyethylene 1-hexyloctyl ether, polyoxyethylene 1-pentylheptyl ether and polyoxyethylene 1-heptylpentyl ether; polyoxyalkylene alkenyl ethers, such as polyoxyethylene oleyl ether; polyoxyalkylene alkylphenyl ethers, such as polyoxyethylene octylphenyl ether, polyoxyethylene nonylphenyl ether, and polyoxyethylene dodecylphenyl ether; polyoxyalkylene alkylarylphenyl ethers, such as polyoxyethylene tribenzyl phenyl, polyoxyethylene dibenzylphenyl ether, and polyoxyethylene benzylphenyl ether; polyoxyalkylene fatty acid esters, such as polyoxyethylene monolaurate, polyoxyethylene monooleate, polyoxyethylene monostearate, polyoxyethylene monomyristylate, polyoxyethylene dilaurate, polyoxyethylene dioleate, polyoxyethylene dimyristylate, and polyoxyethylene distearate; sorbitan esters, such as sorbitan monopalmitate and sorbitan monooleate; polyoxyalkylene sorbitan fatty acid esters, such as polyoxyethylene sorbitan monostearate and polyoxyethylene sorbitan monooleate; glycerin fatty acid esters, such as glycerin monostearate, glycerin monolaurate and glycerin monopalmitate; polyoxyalkylene sorbitol fatty acid esters; sucrose fatty acid esters; polyoxyalkylene castor oil ethers, such as polyoxyethylene castor oil ether; polyoxyalkylene hydrogenated castor oil ethers, such as polyoxyethylene hydrogenated castor oil ether; polyoxyalkylene alkyl aminoethers, such as polyoxyethylene lauryl aminoether and polyoxyethylene stearyl aminoether; oxyethylene-oxypropylene block or random copolymers; terminally alkyletherified oxyethylene-oxypropylene block or random copolymers; and terminally sucrose-etherified oxyethylene-oxypropylene block or random copolymers.

Of those nonionic surfactants, branched polyoxyalkylene primary alkylethers, branched polyoxyalkylene secondary alkylethers, polyoxyalkylene alkenyl ethers, polyoxyalkylene alkylphenyl ethers, polyoxyalkylene fatty acid esters, oxyethylene-oxypropylene block copolymers and terminally alkyletherified oxyethylene-oxypropylene block copolymers are preferable for their excellent performance to emulsify silicone compounds in water. Furthermore, oxyethylene-oxypropylene block or random copolymers and terminally alkyletherified oxyethylene-oxypropylene block copolymers are more preferable for their performance to change into a tarry substance on fiber in baking process so as to protect fiber from damage.

The anionic surfactants include, for example, fatty acids and their salts, such as oleic acid, palmitic acid, sodium oleate, potassium palmitate and triethanolamine oleate; hydroxyl-group-containing carboxylic acids and their salts, such as hydroxyacetic acid, potassium hydroxyacetate, lactic acid and potassium lactate; polyoxyalkylene alkylether acetic acids and their salts, such as polyoxyalkylene tridecyl ether acetic acid and its sodium salt; salts of carboxyl-polysubstituted aromatic compounds, such as potassium trimellitate and potassium pyromellitate; alkylbenzene sulfonic acids and their salts, such as dodecylbenzene sulfonic acid and its sodium salt; polyoxyalkylene alkylether sulfonic acids and their salts, such as polyoxyethylene 2-ethylhexyl ether sulfonic acids and its potassium salt; higher fatty acid amide sulfonic acids and their salts, such as stearoyl methyltaurine and its sodium salt, lauroyl methyltaurine and its sodium salt, myristoyl methyltaurine and its sodium salt and palmitoyl methyltaurine and its sodium salt; N-acyl sarcosine acids and their salts, such as lauroyl sarcosine acid and its sodium salt; alkyl phosphonic acids and their salts, such as octyl phosphonate and its potassium salt; aromatic phosphonic acids and their salts, such as phenyl phosphonate and its potassium salt; alkyl phosphonic acid alkyl phosphates and their salts, such as 2-ethylhexyl phosphonate mono-2-ethylhexyl ester and its potassium salt; nitrogen-containing alkyl phosphonic acids and their salts, such as aminoethyl phosphonic acid and its diethanol amine salt; alkyl sulfates and their salts, such as 2-ethylhexyl sulfate and its sodium salt; polyoxyalkylene sulfates and their salts, such as polyoxyethylene 2-ethylhexyl ether sulfate and its sodium salt; long-chain sulfosuccinate salts, such as sodium di-2-ethylhexyl sulfosuccinate and sodium dioctyl sulfosuccinate; and long-chain N-acyl glutamates, such as monosodium N-lauroyl glutamate and disodium N-stearoyl-L-glutamate.

The cationic surfactants include, for example, quaternary ammonium salts, such as lauryltrimethyl ammonium chloride and oleylmethylethyl ammonium ethosulfate; and (polyoxyalkylene) alkylaminoether salts, such as (polyoxyethylene) lauryl aminoether lactate salt, stearyl aminoether lactate salt, and (polyoxyethylene) lauryl aminoether trimethyl phosphate salt.

The amphoteric surfactants include, for example, imidazoline amphoteric surfactants, such as sodium 2-undecyl-N,N-(hydroxyethyl carboxymethyl)-2-imidazolinate and disodium 2-cocoyl-2-imidazolinium hydroxyde-1-carboxyethyloxiate; betaine amphoteric surfactants, such as 2-heptadecyl-N-carboxymethyl-N-hydroxyethyl imidazolium betaine, lauryldimethyl aminoacetic acid betaine, alkyl betaine, amidobetaine and sulfobetaine; and amino acid amphoteric surfactants, such as N-lauryl glycine, N-lauryl-β-alanine and N-stearyl-β-alanine.

Of those surfactants mentioned above, ionic surfactants can change with time in the emulsion of a precursor finish and can influence on the cross-linking performance of silicones. Thus nonionic surfactants are preferable for a precursor finish owing to their stability through a storage period, minimum influence on silicone cross-linking performance and excellent performance to emulsify silicones.

The weight ratio of the surfactant in the non-volatile components of the precursor finish of the present invention should preferably range from 1 to 40 wt %, more preferably from 5 to 30 wt %, and further more preferably from 8 to 25 wt %. A weight ratio of the surfactant less than 1 wt % can fail to make stable aqueous finish emulsion, while a weight ratio more than 40 wt % can result in poor heat resistance of the finish and fails to prevent carbon fiber from fusing in baking process.

The precursor finish of the present invention can further contain silicones other than the modified silicone having a nitrogen-containing modifying group so far as those silicones do not inhibit the effect of the present invention. Specifically, those silicones include dimethyl silicones, epoxy-modified silicones, alkylene-oxide-modified silicones (polyether-modified silicones), epoxy-polyether-modified silicones (refer to JP4616934), carboxy-modified silicones, carbinol-modified silicones, alkyl-modified silicones, phenol-modified silicones, methacrylate-modified silicones, alkoxy-modified silicones, and fluorine-modified silicones.

The precursor finish of the present invention can further contain components other than those mentioned above so far as those components do not inhibit the effect of the present invention. Those components include antioxidants, such as phenolic, amine, sulfur, phosphorus or quinone compounds; antistats, such as sulfate salts of higher alcohol or higher alcoholic ethers, sulfonate salts, phosphate salts of higher alcohol or higher alcoholic ethers, cationic surfactants of quaternary ammonium salts, and cationic surfactants of amine salts; lubricants, such as alkyl esters of higher alcohol, ethers of higher alcohol, and waxes; antibacterial agents; antiseptics; anticorrosive agents; and hygroscopic agents.

The precursor finish of the present invention should preferably contain substantially no antioxidants. An antioxidant accelerates the decomposition of a modified silicone having a nitrogen-containing modifying group in baking process, and can decrease the heat resistance of the precursor finish. A precursor finish containing an antioxidant can fail to prevent carbon fiber fusing in baking process and thus inhibits the production of carbon fiber having sufficient tenacity. A precursor finish substantially containing no antioxidants means a finish containing an antioxidant in an amount not more than 1.0 wt % of the weight of a modified silicone having a nitrogen-containing modifying group contained in the finish. The amount should more preferably be not more than 0.5 wt %, further more preferably not more than 0.1 wt %, and most preferably 0 wt %.

The precursor finish of the present invention should preferably contain no phosphate salts produced by neutralizing the acidic phosphate ester (B) of the present invention. Such phosphate salts can deteriorate the stability of an aqueous emulsion of the finish and also can decrease the tenacity of resultant carbon fiber. Such phosphate salts include the alkali metal (Na, K, etc.) salts, alkaline earth metal (Ca, Mg, Ba, etc.) salts, ammonium salts, quaternary ammonium salts and amine salts of the acidic phosphate ester (B) of the present invention.

Although the precursor finish can be formulated with only the non-volatile components mentioned above, the finish should preferably contain a surfactant as an emulsifier and be formed into an aqueous emulsion in which the components are emulsified or dispersed in order to attain uniform finish application on precursor and secure the safety in working environment.

If the precursor finish of the present invention contains water, the weight ratios of water and the non-volatile components to the whole of the precursor finish are not specifically restricted, and should be determined according to the transportation cost of the precursor finish and handling property dependent on the viscosity of the precursor finish. The weight ratio of water in the whole of the precursor finish should preferably range from 0.1 to 99.9 wt %, more preferably from 10 to 99.5 wt %, and further more preferably from 50 to 99 wt %. The weight ratio (concentration) of the non-volatile components in the whole of the precursor finish should preferably range from 0.01 to 99.9 wt %, more preferably from 0.5 to 90 wt %, and further more preferably from 1 to 50 wt %.

The precursor finish of the present invention is formulated by mixing the components mentioned above. If the precursor finish is a composition prepared by emulsifying or dispersing the components in water, the method for emulsifying or dispersing the components mentioned above is not specifically restricted and any known methods are employable. Such methods include, for example, a method of dispersing and emulsifying the components of a precursor finish by adding each of them in warm water with agitation, or a method of mixing each of the components of a precursor finish and emulsifying the mixture through phase conversion where water is gradually added to the mixture being subjected to mechanical shear with a homogenizer, homogenizing mixer or ball mill.

The precursor finish can also be prepared by emulsifying or dispersing the components other than the acidic phosphate ester (B) with the techniques mentioned above and by blending the acidic phosphate ester (B) in the resultant emulsion.

Carbon fiber precursor and carbon fiber are produced with the precursor finish of the present invention. The production method for the precursor and carbon fiber with the precursor finish of the present invention is not specifically restricted, and can include, for example, the methods described below.

[Production Method for Precursor and Carbon Fiber]

The carbon fiber production method of the present invention includes fiber production process, oxidative stabilization process and carbonization process. The carbon fiber precursor of the present invention is produced in the fiber production process.

The fiber production process includes the finish application step and drawing step where carbon fiber precursor is produced by applying an acrylic-fiber finish for carbon-fiber production (precursor finish) to acrylic fiber which is the basic material of the acrylic fiber for carbon-fiber production (precursor).

At the finish application step, acrylic fiber which is the basic material of carbon fiber precursor is spun and applied with the precursor finish, in other words, the precursor finish is applied to as-spun acrylic fiber which is the basic material of carbon fiber precursor at the finish application step. The acrylic fiber which is the basic material of carbon fiber precursor is drawn soon after it is extruded, and further drawn with high draw ratio after finish application at the stage called "drawing step". The drawing operation can be carried out in wet-heat drawing with hot steam or in dry-heat drawing with hot rollers.

The precursor is comprised of acrylic fiber mainly comprising a polyacrylonitrile polymer produced by copolymerizing at least 95 mol % of acrylonitrile and 5 mol % or less of an oxidization promoter. A preferable oxidization promoter is a vinyl-group-containing compound which is copolymerizable with acrylonitrile. The fineness of a single precursor fiber is not specifically restricted, and should preferably range from 0.1 to 2.0 dtex for a good compromise between precursor performance and production cost. The number of single fiber constituting a precursor strand is not specifically restricted and preferably ranges from 1,000 to 96,000 for a good compromise between precursor performance and production cost.

The precursor finish can be applied to the acrylic fiber which is the basic material of carbon fiber precursor at any steps of the fiber production process, and should preferably be applied to acrylic fiber once before the drawing step. The precursor finish can be applied to acrylic fiber at any steps before the drawing step, for example, just after fiber extrusion. The precursor finish can also be re-applied to acrylic fiber at any steps after the drawing step, for example, just after drawing, at take-up step or just before oxidative stabilization process. For finish application, rollers can be employed for applying a precursor finish comprising non-volatile components alone, i.e., a neat finish, or bath immersion or a spray can be employed for applying a precursor finish being dispersed or emulsified in a medium such as water or an organic solvent.

The amount of a precursor finish applied to precursor fiber should preferably range from 0.1 to 2 wt % of precursor weight, and more preferably from 0.3 to 1.5 wt %, for balancing the prevention of adhesion or fusion of precursor fiber strands and prevention of the decrease of carbon fiber quality with the aide of coked precursor finish in carbonization process. An amount of a precursor finish on fiber less than 0.1 wt % can not sufficiently prevent adhesion and fusion of precursor fiber strands to result in decreased carbon fiber tenacity. On the other hand, an amount of a precursor finish on fiber more than 2 wt % results in excessive coating on single fibers that can inhibit oxygen supply to precursor in oxidative stabilization process and decrease carbon fiber tenacity. The amount of a precursor finish on precursor mentioned here is defined to be the percentage of the weight of the non-volatile components in the precursor finish on the precursor to the weight of the precursor.

In the oxidative stabilization process, precursor applied with a precursor finish is converted into oxidized fiber at 200 to 300 deg.C. in an oxidative atmosphere, which is usually the air. The temperature of the oxidative atmosphere preferably ranges from 230 to 280 deg.C. In the oxidative stabilization process, acrylic fiber precursor applied with a precursor finish is heated for 20 to 100 minutes (preferably 30 to 60 minutes) being subjected to a tension given by drawing with a draw ratio ranging from 0.90 to 1.10 (preferably from 0.95 to 1.05). The oxidative stabilization process produces oxidized fiber having flame-retardant structure through intramolecular cyclization and the addition of oxygen to the cyclic structure.

In the carbonizing ation process, the oxidized fiber is carbonized at 300 to 2,000 deg.C. in an inert atmosphere. At first, the oxidized fiber should be treated in a preliminary carbonization process (the first carbonization process), where the oxidized fiber is heated for several minutes being subjected to a tension given by a draw ratio ranging from 0.95 to 1.15 in an inert atmosphere of nitrogen or argon in a furnace with elevating temperature from 300 to 800 deg.C. Then, following to the first carbonization process, the oxidized fiber is treated in the second carbonization process to be further carbonized and graphitized, where the oxidized fiber after the first carbonization process is heated for several minutes being subjected to a tension given by a draw ratio ranging from 0.95 to 1.05 in an inert atmosphere of nitrogen or argon to be carbonized. The heating temperature in the second carbonization process should be controlled to be elevated to a highest temperature at least 1000 deg.C. (preferably in a range from 1000 to 2000 deg.C.). The highest temperature is selected according to the properties (tenacity, elastic modulus, etc.) required for a desirable carbon fiber.

The carbon fiber production method of the present invention can include graphitization process following to the carbonization process, when a carbon fiber of higher elastic modulus is desired. The graphitization is usually carried out by tensioning carbon fiber after carbonization process in an inert atmosphere of nitrogen or argon at a temperature ranging from 2000 to 3000 deg.C.

Carbon fiber produced in the method mentioned above can be subjected to surface treatment for improving its adhesive strength to a matrix resin according to the end uses of resultant composite material. Gas-phase or liquid-phase treatment can be employed for the surface treatment, and liquid-phase treatment with an acidic or alkaline electrolyte is preferable for better efficiency in composite production. Furthermore, various sizing agents having good compatibility to matrix resins can be applied to carbon fiber to improve the processability and handling property of the carbon fiber.

EXAMPLES

The present invention is specifically described with the following examples, though the present invention is not restricted within the scope of those examples. The percent described in the following examples represents wt % (weight percent) unless otherwise specified. The properties were determined in the methods mentioned below.

[Amount of Finish on Fiber]

A finish-applied precursor was treated in alkaline fusion with potassium hydroxide and sodium butyrate, and dissolved in water. Then the pH of the resultant solution was controlled at 1 with hydrochloric acid. The solution was colored with sodium sulfite and ammonium molybdate and subjected to colorimetric determination of silicic molybdenum blue, which shows its peak at 815 nm wave length, and thus the amount of silicon in the solution was determined. The amount (wt %) of the precursor finish on the precursor was calculated from the amount of silicon determined above and the ratio of silicon in the precursor finish previously determined in the same manner.

[Stability of Finish Emulsion]

Emulsions of precursor finishes containing 3.0 wt % of non-volatile components were stored in a thermostatic bath at 50 deg.C. The appearance of the emulsions was visually inspected and evaluated according to the following criteria.

⊚: a no separation in 60 days
○: no separation in 30 days and separation observed in 60 days
Δ: no separation in 7 days and separation observed in 30 days
x: separation observed in 7 days
xx: separation observed within 1 day or not emulsified

[Volatile Weight Loss]

Each of the emulsions of precursor finishes was weighed in an aluminum cup of 60 mm in diameter in an amount containing 1 g of non-volatile components. Then the emulsion was dried in an oven at 105 deg.C. for 3 hours to remove water and the resultant specimen was accurately weighed (W1). The specimen was then heated at 160 deg.C. for 180 min or at 250 deg.C. for 60 min, in a geer oven, and accurately weighed (W2). The thermal weight loss of the specimen due to heating was calculated by the following expression.

$$(W1-W2)/W1 \times 100 = \text{thermal weight loss (wt \%)}$$

[Cross-Linking Efficiency]

Each of the emulsions of precursor finishes was weighed in an aluminum cup of 60 mm in diameter in an amount containing 1 g of non-volatile components. Then the emulsion was dried in an oven at 105 deg.C. for 3 hours to remove water and the resultant specimen was accurately weighed (W3). The specimen was then heated at 160 deg.C. for 180 min or at 250 deg.C. for 60 min, in a geer oven. The specimen after heating was dissolved in chloroform and fractionated into soluble and insoluble portion. The insoluble fraction was left at room temperature for 3 hours and then heated at 80 deg.C. for 20 min to remove chloroform, and then accurately weighed (W4). The cross-linking efficiency of the precursor finish was calculated by the following expression.

$$W4/W3 \times 100 = \text{cross-linking efficiency (wt \%)}$$

[Fiber Production Efficiency (Represented by Stain on Roller)]

The degree of stain (gumming up of finish) on a drying roller after drying 50 kg of a finish-applied precursor was evaluated with the following criteria.

⊚: no stain from finish gumming up on the roller to cause no problems in fiber production efficiency
○: a little stain from finish gumming up on the roller to cause no problems in fiber production efficiency
Δ: some stain from finish gumming up on the roller to cause no problems in fiber production efficiency
x: stain from finish gumming up on the roller to cause a little inferior fiber production efficiency
xx: a lot of stain from finish gumming up on the roller to cause single fiber separation and fiber wrapping on rollers in fiber production

[Fiber Fusing Preventability]

Twenty points on carbon fiber were randomly selected, and a 10-mm short fiber strand was cut out at each point. The fusing of each short fiber strand was inspected and evaluated with the following criteria.

⊚: no fusing
○: almost no fusing
ΔL: a little fusing
x: a lot of fusing

[Carbon Fiber Tenacity]

The tenacity of a carbon fiber was measured according to the testing method for epoxy-impregnated strand defined in JIS-R-7601, and the average of ten times of measurement was determined as the tenacity (GPa) of the carbon fiber tested.

Examples of Production of an Acidic Phosphate Ester (B)

Example of Production 1

In a reactor purged with nitrogen, 976 parts of POE (12) $C_{11}$-$C_{15}$ alkyl ether (with theoretical molecular weight of 728 for POE (12) $C_{13}$ alkyl ether) was charged and heated to about 65 deg.C. with agitation. Then 24 parts of phosphoric acid anhydride ($P_2O_5$, with theoretical molecular weight of 142) was added with agitation and esterification was performed at about 80 deg.C. for 2 hours to obtain the mixture p-1 containing a polyoxyethylene alkylphosphate ester P-1 and unreacted polyoxyethylene alkylether. The mixture p-1 had an acid value of 28.8 mgKOH/g, and the equivalent of the phosphoric acid anhydride to 1 mole of the polyoxyethylene alkylether was 0.252. The theoretical molecular weight of compounds mentioned in Examples of production herein is a formula weight based on the chemical formula of each compound.

The weight ratio of the polyoxyethylene alkylphosphate ester P-1 in the mixture p-1 was determined to be 35.3 wt % with anion-exchange chromatography. Thus the acid value of the polyoxyethylene alkylphosphate ester P-1 was determined to be 81.6 mgKOH/g (28.8/0.353). The ratio between the phosphate monoester and phosphate diester was 59.4:40.6.

Example of Production 2

In a reactor purged with nitrogen, 975 parts of POE (9) $C_{11}$-$C_{15}$ alkyl ether (with theoretical molecular weight of 596 for POE (9) $C_{13}$ alkyl ether) was charged and heated to about 65 deg.C. with agitation. Then 25 parts of phosphoric acid anhydride ($P_2O_5$, with theoretical molecular weight of 142) was added with agitation and esterification was performed at about 80 deg.C. for 2 hours to obtain the mixture p-2 containing a polyoxyethylene alkylphosphate ester P-2 and unreacted polyoxyethylene alkylether. The mixture p-2 had an acid value of 30.0 mgKOH/g, and the equivalent of the phosphoric acid anhydride to 1 mole of the polyoxyethylene alkylether was 0.215.

The weight ratio of the polyoxyethylene alkylphosphate ester P-2 in the mixture p-2 was determined to be 30.1 wt % with anion-exchange chromatography. Thus the acid value of the polyoxyethylene alkylphosphate ester was determined to be 99.7 mgKOH/g (30.0/0.301). The ratio between the phosphate monoester and phosphate diester was 60.5:39.5.

Example of Production 3

In a reactor purged with nitrogen, 958 parts of POE (9) $C_{12}$ alkyl ether (with theoretical molecular weight of 540) was charged and heated to about 65 deg.C. with agitation. Then 42 parts of phosphoric acid anhydride ($P_2O_5$, with theoretical molecular weight of 142) was added with agitation and esterification was performed at about 80 deg.C. for 2 hours to obtain the mixture p-3 containing a polyoxyethylene alkylphosphate ester P-3 and unreacted polyoxyethylene alkylether. The mixture p-3 had an acid value of 50.4 mgKOH/g, and the equivalent of the phosphoric acid anhydride to 1 mole of the polyoxyethylene alkylether was 0.333.

The weight ratio of the polyoxyethylene alkylphosphate ester P-3 in the mixture p-3 was determined to be 46.7 wt % with anion-exchange chromatography. Thus the acid value of the polyoxyethylene alkylphosphate ester was determined to be 108.0 mgKOH/g (50.4/0.467). The ratio between the phosphate monoester and phosphate diester was 65.2:34.8.

Example of production 4

In a reactor purged with nitrogen, 947 parts of POE (8) $C_8$ alkyl ether (with theoretical molecular weight of 482) was charged and heated to about 65 deg.C. with agitation. Then 53 parts of phosphoric acid anhydride ($P_2O_5$, with theoretical molecular weight of 142) was added with agitation and esterification was performed at about 80 deg.C. for 2 hours to obtain the mixture p-4 containing a polyoxyethylene alkylphosphate ester P-4 and unreacted polyoxyethylene alkylether. The mixture p-4 had an acid value of 63.6 mgKOH/g, and the equivalent of the phosphoric acid anhydride to 1 mole of the polyoxyethylene alkylether was 0.380.

The weight ratio of the polyoxyethylene alkylphosphate ester P-4 in the mixture p-4 was determined to be 53.2 wt % with anion-exchange chromatography. Thus the acid value of the polyoxyethylene alkylphosphate ester was determined to be 119.5 mgKOH/g (63.6/0.532). The ratio between the phosphate monoester and phosphate diester was 59.7:40.3.

Example of production 5

In a reactor purged with nitrogen, 938 parts of POE (5) $C_{18}$ alkyl ether (with theoretical molecular weight of 490) was charged and heated to about 65 deg.C. with agitation. Then 62 parts of phosphoric acid anhydride ($P_2O_5$, with theoretical molecular weight of 142) was added with agitation and esterification was performed at about 80 deg.C. for 2 hours to obtain the mixture p-5 containing a polyoxyethylene alkylphosphate ester P-5 and unreacted polyoxyethylene alkylether. The mixture p-5 had an acid value of 74.4 mgKOH/g, and the equivalent of the phosphoric acid anhydride to 1 mole of the polyoxyethylene alkylether was 0.456.

The weight ratio of the polyoxyethylene alkylphosphate ester P-5 in the mixture p-5 was determined to be 63.9 wt % with anion-exchange chromatography. Thus the acid value of the polyoxyethylene alkylphosphate ester was determined to be 116.4 mgKOH/g (74.4/0.639). The ratio between the phosphate monoester and phosphate diester was 58.8:41.2.

Example of Production of an Acidic Phosphate Ester Other than the Acidic Phosphate Ester (B)

Example of Production 6

In a reactor purged with nitrogen, 965 parts of POE (9) nonylphenol ether (with theoretical molecular weight of 616) was charged and heated to about 65 deg.C. with agitation. Then 35 parts of phosphoric acid anhydride ($P_2O_5$, with theoretical molecular weight of 142) was added with agitation and esterification was performed at about 80 deg.C. for 2 hours to obtain the mixture p-6 containing a polyoxyethylene nonylphenolphosphate ester P-6 and unreacted polyoxyethylene nonylphenolether. The mixture p-6 had an acid value of 42.0 mgKOH/g, and the equivalent of the phosphoric acid anhydride to 1 mole of the polyoxyethylene nonylphenolether was 0.315.

The weight ratio of the polyoxyethylene nonylphenolphosphate ester P-6 in the mixture p-6 was determined to be 44.1 wt % with anion-exchange chromatography. Thus the acid value of the polyoxyethylene nonylphenolphosphate ester was determined to be 95.2 mgKOH/g (42.0/0.441). The ratio between the phosphate monoester and phosphate diester was 60.2:39.8.

Examples of Production of a Phosphate Salt

Example of Production 7

To 970 parts of the mixture p-1 obtained in Example of production 1, 30 parts of potassium hydroxide was gradually added to perform neutralization reaction, and a mixture p-1a containing the neutralization product, phosphate salt P-1a, was obtained.

Example of Production 8

To 945 parts of the mixture p-1 obtained in Example of production 1, 55 parts of diethanol amine was gradually added to perform neutralization reaction, and a mixture p-1b containing the neutralization product, phosphate salt P-1b, was obtained.

Example of Production 9

To 957 parts of the mixture p-6 obtained in Example of production 6, 43 parts of potassium hydroxide was gradually added to perform neutralization reaction, and a mixture p-6a containing the neutralization product, phosphate salt P-6a, was obtained.

[Description of Components]

Modified silicone S-1: diamine-type amino-modified silicone (with viscosity of 1,300 $mm^2$/s @ 25 deg.C., containing 0.8 wt % of amino and 0.7 wt % of nitrogen)

Modified silicone S-2: monoamine-type amino-modified silicone (with viscosity of 1,700 $mm^2$/s @ 25 deg.C., containing 0.4 wt % of amino and 0.35 wt % of nitrogen)

Modified silicone S-3: diamine-type amino-modified silicone (with viscosity of 1,300 $mm^2$/s @ 25 deg.C., containing 2.7 wt % of amino and 2.4 wt % of nitrogen)

Example 1

According to the ratio of non-volatile components shown in Table 1, the modified silicone S-1, mixture p-1, surfactant E-1 (POE (9) $C_{12}$-$C_{14}$ alkyl ether) and surfactant E-2 (POE (5) $C_{12}$-$C_{14}$ alkyl ether) were mixed with water to be emulsified and prepared into a precursor finish emulsion containing 3.0 wt % of the non-volatile components consisting of 83.3 wt % of the modified silicone (A), 1.1 wt % of the acidic phosphate ester (B) and 15.6 wt % of surfactants.

The finish emulsion was applied to an acrylic fiber, which was the basic material of carbon fiber precursor and consisted of a copolymer of 97 mol % of acrylonitrile and 3 mol % of itaconic acid, to 1.0% of fiber weight. The acrylic fiber was then processed into carbon fiber precursor (of 24,000 filament count with monofilament fineness of 0.8 dtex) through steam drawing step with 2.1 draw ratio. The resultant precursor was oxidized in an oxidation furnace at 250 deg.C. for 60 minutes and subsequently baked in nitrogen atmosphere to be converted into carbon fiber in a carbonization furnace where the heating temperature was elevated from 300 to 1400 deg.C. The properties of the resultant carbon fiber are shown in Table 1.

Examples 2 to 10, and Comparative Examples 1 to 8

Finish-applied precursors and carbon fibers were produced in the same manner as described in Example 1 except that finish emulsions were prepared to contain the non-volatile components shown in Tables 1 to 4. The properties of the finish-applied precursors and the resultant carbon fibers are shown in Tables 1 to 4.

TABLE 1

| | | Example | | | | |
|---|---|---|---|---|---|---|
| | | 1 | 2 | 3 | 4 | 5 |
| Non-volatile components | Modified silicone S-1 | 83.3 | 81.5 | 79.8 | 80.0 | |
| | Modified silicone S-2 | | | | | 80.0 |
| | Modified silicone S-3 | | | | | |
| | Mixture p-1 | 3.0 | 5.0 | 7.0 | 10.0 | 17.5 |
| | Mixture p-2 | | | | | |
| | Mixture p-3 | | | | | |
| | Mixture p-4 | | | | | |
| | Mixture p-5 | | | | | |
| | Surfactant E-1 | 6.2 | 6.2 | 6.0 | 5.0 | |
| | Surfactant E-2 | 7.5 | 7.3 | 7.2 | 5.0 | 2.5 |
| Weight ratio of acidic phosphate ester (B) (wt %) | | 1.1 | 1.8 | 2.5 | 3.5 | 6.2 |
| Weight ratio of surfactant (wt %) | | 15.6 | 16.7 | 17.7 | 16.5 | 13.8 |
| Modified silicone (A):acidic phosphate ester (B) | | 98.7:1.3 | 97.8:2.2 | 97.0:3.0 | 95.8:4.2 | 92.8:7.2 |
| Stability of finish emulsion | | ◎ | ◎ | ◎ | ◎ | ◎ |
| Volatile weight loss @ 160 deg. C. for 180 min (wt %) | | 4.6 | 4.6 | 4.8 | 5.7 | 7.9 |
| Cross-linking efficiency @ 160° C. for 180 min (wt %) | | 3.0 | 3.4 | 3.0 | 4.9 | 7.2 |
| Volatile weight loss @ 250° C. for 60 min (wt %) | | 12.9 | 16.8 | 18.1 | 22.3 | 25.6 |
| Cross-linking efficiency @ 250° C. for 60 min (wt %) | | 60.4 | 49.1 | 44.7 | 28.2 | 34.8 |
| Amount of finish on fiber (wt %) | | 1.2 | 1.2 | 1.1 | 1.2 | 1.1 |
| Fiber production efficiency | | ◎ | ◎ | ◎ | ◎ | ◎ |
| Fiber fusing preventability | | ◎ | ◎ | ◎ | ○ | ○ |
| Carbon fiber tenacity (GPa) | | 5.05 | 4.97 | 4.89 | 4.97 | 4.81 |

TABLE 2

| | | Example | | | | |
|---|---|---|---|---|---|---|
| | | 6 | 7 | 8 | 9 | 10 |
| Non-volatile components | Modified silicone S-1 | 83.3 | 80.7 | 83.2 | 81.0 | |
| | Modified silicone S-2 | | | | | |
| | Modified silicone S-3 | | | | | 81.5 |
| | Mixture p-1 | | | | | 7.0 |
| | Mixture p-2 | 2.5 | | | | |
| | Mixture p-3 | | 5.0 | | | |
| | Mixture p-4 | | | 2.0 | | |
| | Mixture p-5 | | | | 1.5 | |
| | Surfactant E-1 | 6.8 | 6.5 | 7.2 | 8.7 | 5.2 |
| | Surfactant E-2 | 7.4 | 7.8 | 7.6 | 8.8 | 6.3 |
| Weight ratio of acidic phosphate ester (B) (wt %) | | 0.8 | 2.3 | 1.1 | 1.0 | 2.5 |
| Weight ratio of surfactant (wt %) | | 15.9 | 17.0 | 15.7 | 18.0 | 16.0 |
| Modified silicone (A):acidic phosphate ester (B) | | 99.0:1.0 | 97.2:2.8 | 98.7:1.3 | 98.8:1.2 | 97.0:3.0 |
| Stability of finish emulsion | | ◎ | ◎ | ○ | ○ | ○ |
| Volatile weight loss @ 160 deg. C. for 180 min (wt %) | | 3.7 | 3.8 | 5.0 | 3.7 | 4.2 |

TABLE 2-continued

|  | Example | | | | |
|---|---|---|---|---|---|
|  | 6 | 7 | 8 | 9 | 10 |
| Cross-linking efficiency @ 160° C. for 180 min (wt %) | 3.4 | 3.0 | 4.3 | 4.7 | 3.7 |
| Volatile weight loss @ 250° C. for 60 min (wt %) | 16.4 | 23.8 | 18.0 | 16.2 | 20.1 |
| Cross-linking efficiency @ 250° C. for 60 min (wt %) | 39.3 | 23.1 | 46.7 | 31.7 | 59.1 |
| Amount of finish on fiber (wt %) | 1.1 | 1.0 | 1.2 | 1.1 | 1.0 |
| Fiber production efficiency | ◎ | ◎ | ◎ | ◎ | ◎ |
| Fiber fusing preventability | ◎ | ○ | ◎ | ◎ | ○ |
| Carbon fiber tenacity (GPa) | 5.01 | 4.90 | 4.88 | 4.91 | 4.84 |

TABLE 3

| | | Comparative example | | | | |
|---|---|---|---|---|---|---|
| | | 1 | 2 | 3 | 4 | 5 |
| Non-volatile components | Modified silicone S-1 | 85.0 | 83.3 | 83.3 | 83.3 | 83.3 |
| | Modified silicone S-2 | | | | | |
| | Modified silicone S-3 | | | | | |
| | Mixture p-1a | | 3.0 | | | |
| | Mixture p-1b | | | 3.0 | | |
| | Mixture p-6 | | | | 3.0 | |
| | Mixture p-6a | | | | | 3.0 |
| | MP-4 | | | | | |
| | Surfactant E-1 | 6.8 | 6.2 | 6.2 | 6.0 | 6.1 |
| | Surfactant E-2 | 8.2 | 7.5 | 7.5 | 7.7 | 7.6 |
| | Antioxidant | | | | | 1.3 |
| Weight ratio of acidic phosphate ester (B) (wt %) | | | | | | |
| Weight ratio of phosphate salt (wt %) | | | 1.1 | 1.2 | | 1.4 |
| Weight ratio of surfactant (wt %) | | 15.0 | 15.6 | 15.5 | 15.4 | 15.3 |
| Modified silicone (A):acidic phosphate ester (B) | | 100:0 | 100:0 | 100:0 | 98.5:1.5 | 100:0 |
| Stability of finish emulsion | | ◎ | X | Δ | ◎ | X |
| Volatile weight loss @ 160 deg. C. for 180 min (wt %) | | 6.9 | 5.1 | 4.2 | 5.6 | 6.1 |
| Cross-linking efficiency @ 160° C. for 180 min (wt %) | | 76.8 | 3.2 | 4.5 | 3.9 | 4.9 |
| Volatile weight loss @ 250° C. for 60 min (wt %) | | 14.3 | 20.7 | 21.3 | 17.8 | 23.1 |
| Cross-linking efficiency @ 250° C. for 60 min (wt %) | | 72.2 | 70.7 | 65.8 | 42.8 | 48.1 |
| Amount of finish on fiber (wt %) | | 1.2 | 0.9 | 0.9 | 1.1 | 0.8 |
| Fiber production efficiency | | XX | ○ | ○ | ◎ | ○ |
| Fiber fusing preventability | | ○ | ○ | ○ | ○ | ○ |
| Carbon fiber tenacity (GPa) | | 4.51 | 4.25 | 4.39 | 4.47 | 4.21 |

TABLE 4

| | | Comparative example | | |
|---|---|---|---|---|
| | | 6 | 7 | 8 |
| Non-volatile components | Modified silicone S-1 | 83.3 | 84.0 | 82.5 |
| | Modified silicone S-2 | | | |
| | Modified silicone S-3 | | | |
| | Mixture p-1a | | | |
| | Mixture p-1b | | | |
| | Mixture p-6 | | | |
| | Mixture p-6a | | | |
| | MP-4 | 1.1 | | |
| | Surfactant E-1 | 7.0 | 6.3 | 5.7 |
| | Surfactant E-2 | 8.6 | 7.7 | 6.8 |
| | Antioxidant | | 2.0 | 5.0 |
| Weight ratio of acidic phosphate ester (B) (wt %) | | 1.1 | | |
| Weight ratio of phosphate salt (wt %) | | | | |
| Weight ratio of surfactant (wt %) | | 15.6 | 14.0 | 12.5 |
| Modified silicone (A):acidic phosphate ester (B) | | 98.7:1.3 | 100:0 | 100:0 |
| Stability of finish emulsion | | X | Δ | X |
| Volatile weight loss @ 160 deg. C. for 180 min (wt %) | | 6.3 | 5.8 | 5.3 |
| Cross-linking efficiency @ 160° C. for 180 min (wt %) | | 3.5 | 8.2 | 6.4 |
| Volatile weight loss @ 250° C. for 60 min (wt %) | | 28.6 | 41.6 | 78.1 |
| Cross-linking efficiency @ 250° C. for 60 min (wt %) | | 21.4 | 52.1 | 10.1 |
| Amount of finish on fiber (wt %) | | 1.0 | 0.9 | 0.8 |
| Fiber production efficiency | | Δ | ◎ | ◎ |
| Fiber fusing preventability | | ○ | X | X |
| Carbon fiber tenacity (GPa) | | 4.29 | 4.22 | 4.01 |

MP-4 (produced by Dai-Hachi Chemical Industries): an acidic phosphate ester represented by the chemical formula (1), where $R^1$ is a $C_4$ alkyl group, n is 0, a is 1 and b is 2.

Antioxidant: tetrakis [methylene-3-(3',5'-di-t-butyl-4'-hydroxyphenyl) propionate]methane As shown in Tables 3 and 4, the finish of Comparative example 1, which does not contain an antioxidant and the acidic phosphate ester (B), exhibited high cross-linking efficiency in heating at 160 deg.C. for 180 min. The result indicates that the components of the finish will gum up in precursor production process (fiber production process). Thus the finish of Comparative example 1 will result in poor fiber production efficiency.

The finishes of Comparative examples 7 and 8, which contain an antioxidant, resulted in high volatile weight loss in heating at 250 deg.C. for 60 min. The result indicates that the silicones in the finishes decompose in oxidative stabilization process. Thus the finishes of Comparative examples 7 and 8 cannot effectively prevent carbon fiber fusing. In addition, the finishes were made into unstable emulsions and the carbon fibers applied with the finishes exhibited low tenacity.

The finishes of Comparative examples 2, 3 and 5, which contain a phosphate salt, were made into unstable emulsions and the carbon fibers applied with the finishes exhibited low tenacity. The finishes of Comparative examples 4 and 6, which contain an acidic phosphate ester other than the acidic phosphate ester (B), were made into unstable emulsions and the carbon fibers applied with the finishes exhibited low tenacity.

On the other hand, the finishes of Examples exhibited superior properties and performances to that of the finishes of Comparative examples in any of the testing, and contributed to production of carbon fibers having higher tenacity.

INDUSTRIAL APPLICABILITY

The acrylic-fiber finish for carbon-fiber production of the present invention can be used in producing acrylic fiber for carbon-fiber production, and is effective for producing high-grade carbon fiber. The acrylic-fiber for carbon-fiber production of the present invention is applied with the acrylic-fiber finish for carbon-fiber production of the present invention, and is effective for producing high-grade carbon fiber. The carbon fiber production method of the present invention produces high-grade carbon fiber.

What is claimed is:

1. An acrylic-fiber finish for carbon-fiber production, comprising essentially a modified silicone having a modifying group containing a nitrogen atom, and an acidic phosphate ester represented by the following chemical formula (1):

[Chem. 1]

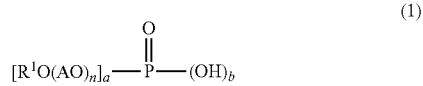
(1)

where $R^1$ represents a $C_{6-22}$ alkyl or alkenyl group, A represents a $C_{2-4}$ alkylene group, and AO represents an oxyalkylene group, n represents a mole number of oxyalkylene group and is an integer ranging from 0 to 20, and each of a and b is an integer of 1 or 2 and meets the equation a+b=3.

2. An acrylic-fiber finish for carbon-fiber production according to claim 1, wherein the weight ratio between the modified silicone and the acidic phosphate ester ranges from 99.6:0.4 to 90:10.

3. An acrylic-fiber finish for carbon-fiber production according to claim 1, wherein the acid value of the acidic phosphate ester ranges from 15 to 500 mgKOH/g.

4. An acrylic-fiber finish for carbon-fiber production according to claim 1, wherein the content of the nitrogen atom ranges from 0.35 to 3.2 wt % of the modified silicone.

5. An acrylic-fiber finish for carbon-fiber production according to claim 1, wherein the modified silicone is an amino-modified silicone.

6. An acrylic-fiber finish for carbon-fiber production according to claim 1, wherein the weight ratio of the modified silicone ranges from 50 to 95 wt % of the non-volatile components of the finish.

7. An acrylic-fiber finish for carbon-fiber production according to claim 1, further comprising a nonionic surfactant, and wherein the weight ratio of the surfactant ranges from 1 to 40 wt % of the non-volatile components of the finish.

8. An acrylic-fiber finish for carbon-fiber production according to claim 1, which is dispersed in water to form an emulsion.

9. An acrylic fiber for carbon-fiber production, which is produced by applying the acrylic-fiber finish according to claim 1 to an acrylic fiber that is a basic material of acrylic fiber for carbon-fiber production.

10. A method of producing carbon fiber comprising the steps of:
  producing an acrylic fiber for carbon-fiber production by applying an acrylic-fiber finish according to claim 1 to an acrylic fiber, the acrylic fiber being a basic material for the acrylic fiber for carbon-fiber production;
  convering the acrylic fiber, with the acrylic-fiber finish into an oxidized fiber the finish-applied acrylic fiber in an oxidative atmosphere at 200 to 300 deg. C.; and
  carbonizing the oxidized fiber in an inert atmosphere at 300 to 2,000 deg. C.

11. An acrylic-fiber finish for carbon-fiber production according to claim 2, wherein the acid value of the acidic phosphate ester ranges from 15 to 500 mgKOH/g.

12. An acrylic-fiber finish for carbon-fiber production according to claim 2, wherein the content of the nitrogen atom ranges from 0.35 to 3.2 wt % of the modified silicone.

13. An acrylic-fiber finish for carbon-fiber production according to claim 3, wherein the content of the nitrogen atom ranges from 0.35 to 3.2 wt % of the modified silicone.

14. An acrylic-fiber finish for carbon-fiber production according to claim 2, wherein the modified silicone is an amino-modified silicone.

15. An acrylic-fiber finish for carbon-fiber production according to claim 3, wherein the modified silicone is an amino-modified silicone.

16. An acrylic-fiber finish for carbon-fiber production according to claim 4, wherein the modified silicone is an amino-modified silicone.

17. An acrylic-fiber finish for carbon-fiber production according to claim 2, wherein the weight ratio of the modified silicone ranges from 50 to 95 wt % of the non-volatile components of the finish.

18. An acrylic-fiber finish for carbon-fiber production according to claim 3, wherein the weight ratio of the modified silicone ranges from 50 to 95 wt % of the non-volatile components of the finish.

19. An acrylic-fiber finish for carbon-fiber production according to claim 4, wherein the weight ratio of the modified silicone ranges from 50 to 95 wt % of the non-volatile components of the finish.

20. An acrylic-fiber finish for carbon-fiber production according to claim 5, wherein the weight ratio of the modified silicone ranges from 50 to 95 wt % of the non-volatile components of the finish.

* * * * *